(12) United States Patent
Kaplun

(10) Patent No.: US 7,147,587 B2
(45) Date of Patent: Dec. 12, 2006

(54) CONTINUOUSLY VARIABLE MECHANICAL TRANSMISSION

(76) Inventor: Gregory Kaplun, 2448 Pennsylvania St., Allentown, PA (US) 18104

( * ) Notice: Subject to any disclaimer, the term of this patent is extended or adjusted under 35 U.S.C. 154(b) by 147 days.

(21) Appl. No.: 10/330,828

(22) Filed: Dec. 27, 2002

(65) Prior Publication Data

US 2004/0127325 A1 Jul. 1, 2004

(51) Int. Cl.
*F16H 15/28* (2006.01)

(52) U.S. Cl. .............................. 476/55; 476/70; 476/71

(58) Field of Classification Search ................. 476/26, 476/36, 38, 47, 55, 70, 71; 74/380, 393, 74/395, 396

See application file for complete search history.

(56) References Cited

U.S. PATENT DOCUMENTS

| | | | | |
|---|---|---|---|---|
| 2,056,101 A | * | 9/1936 | Hall | 476/55 |
| 2,626,002 A | * | 1/1953 | Wubbe | 180/343 |
| 2,737,820 A | * | 3/1956 | Collar | 476/30 |
| 3,333,479 A | * | 8/1967 | Shields | 476/51 |
| 4,161,890 A | * | 7/1979 | Goloff et al. | 476/8 |
| 4,210,032 A | * | 7/1980 | Lampert | 476/1 |
| 5,062,626 A | * | 11/1991 | Dalebout et al. | 482/1 |
| 6,338,692 B1 | * | 1/2002 | Magyari | 476/55 |
| 6,467,374 B1 | * | 10/2002 | Kaplun | 74/640 |

FOREIGN PATENT DOCUMENTS

| | | | |
|---|---|---|---|
| GB | 2028441 A | * | 3/1980 |
| JP | 58072759 A | * | 4/1983 |

* cited by examiner

*Primary Examiner*—William C. Joyce
(74) *Attorney, Agent, or Firm*—Cheryl R. Figlin

(57) ABSTRACT

A continuously variable mechanical transmission comprised of two wheels, either friction or toothed, of which one or both are in the shape of hemispheres. A hemisphere wheel is mounted through a bearing on a mounting with two pivots attached to the outer race of the bearing, allowing the wheel to rotate around two perpendicular accesses. The center of the wheel is attached to the shaft through a single or double universal joint or a flexible shaft. The other wheel can be a regular narrow wheel fixed to the second shaft. By rotating the hemisphere wheel around the mounting pivots the diameter of the wheel engaged with the second wheel is increased or decreased allowing the transmission rate to vary.

13 Claims, 6 Drawing Sheets

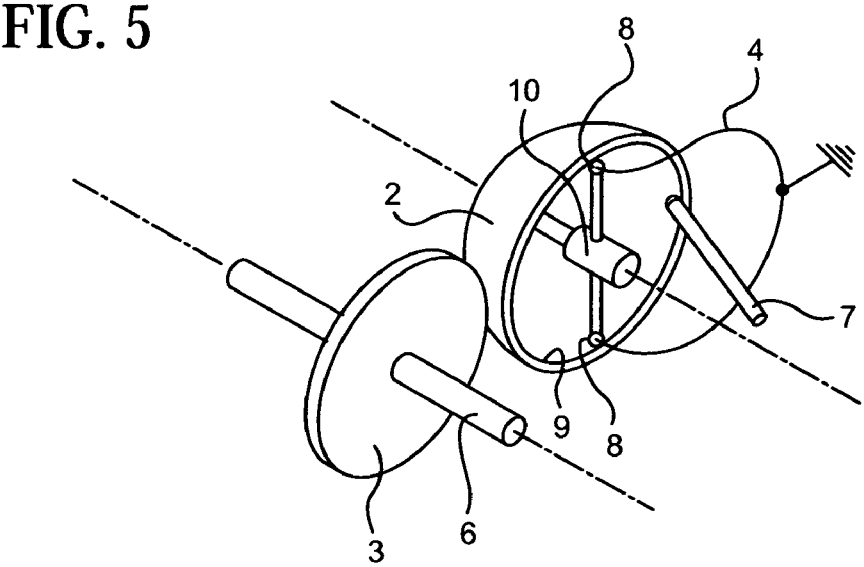
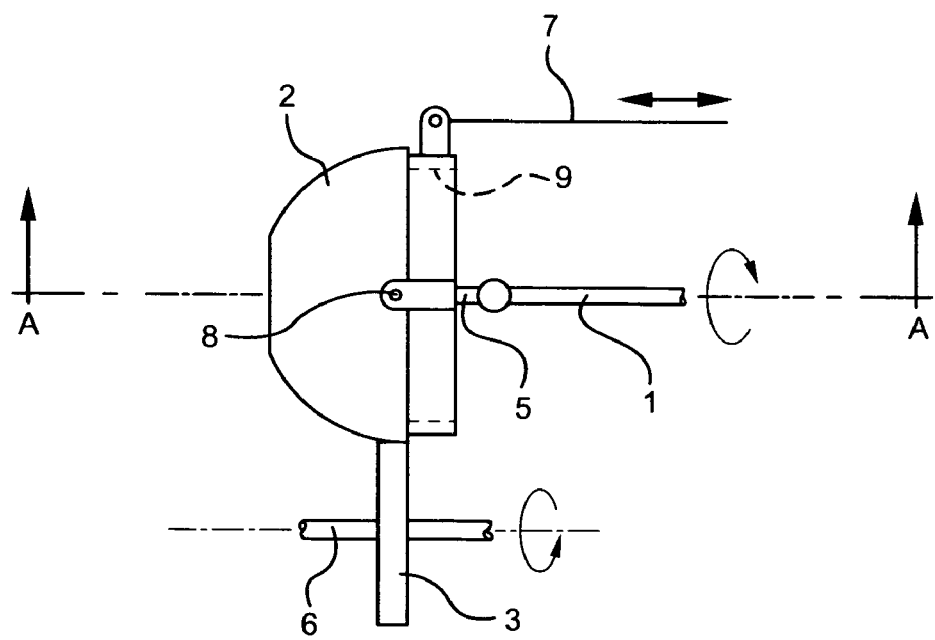

CONTINUOUSLY VARIABLE MECHANICAL TRANSMISSION

CROSS-REFERENCES TO RELATED APPLICATIONS

This application is related to commonly-owned U.S. Pat. No. 6,467,374 entitled "A CONTINUOUSLY VARIABLE MECHANICAL TRANSMISSION" issued Oct. 22, 2002 with inventor Gregory Kaplun.

BACKGROUND OF THE INVENTION (1) Field of the Invention

The invention relates to a mechanical transmission, and more particularly a mechanical transmission that is truly continuously variable.

(2) Description of the Prior Art

The most common mechanical transmission in use today is the sliding gear transmission. It is a very efficient mechanism, but is incapable of automatically changing the speed ratio without manually changing gears. Most power sources can operate only over small speed range with good economy and power. As a result, a large number of gear changes are required for efficient operation.

The present automatic and manual transmissions in use attempt to maximize operating economy and power through a constant maintenance of power source rotational speed at the top of the power curve. These transmissions do not have high efficiency or smooth operation because they must have stepped speed ratio changes. Various types of transmissions utilize braking or slipping actions to accommodate speed rate change. These transmissions generate high internal power losses. Existing designs for continuously variable transmission such as "V" belt transmissions, Hydraulic transmissions and mechanical planetary gear and variable length lever transmissions lack efficiency, simplicity of operation, power transmission capability or operating speed range.

SUMMARY OF THE INVENTION

The object of the present invention is to have a continuously variable mechanical transmission system. The step less ratio change takes advantage of the fact that a hemisphere rotating around its polar axis has larger length of circumference at its major diameter than close to its tip, because the radius of a hemisphere is a constant the transition from the major diameter to a minor produces step less length of circumference change without changing the point of engagement between the hemisphere wheel and a second wheel. The present invention can be adapted to any mechanical variable output device. The hemisphere wheel thus would be mounted on the bearing. The inside race of the bearing would have two opposing pivot points inside the wheels major diameter, allowing the wheel to swing around the mounting fork, the fork is attached to the wall of the transmission. A variation on the mounting scheme would be the wheel to have a cylindrical extension from its major diameter. The extension would be mounted inside the bearing. The outer race of the bearing would have two opposing pivot points extending back over the major diameter of the wheel. The pivot points would be mounted into the body of the transmission. The center of the hemisphere wheel would be connected to the driving shaft through a constant velocity device (single or double universal joint, flexible shaft or similar). Alternatively, a motor can be mounted on a stationary race of the bearing, with its shaft connected to the hemisphere wheel thus eliminating the need for a constant velocity device.

A control lever would have a joint attachment to the stationary race of the wheel bearing, perpendicular to the pivot points. Movement of the control lever would swing the hemisphere wheel around the pivot points, therefore changing the engaged diameter of the wheel. The position of the control lever would determine the transmission rate. If a universal joint is used to connect the driving shaft to the hemisphere wheel, the maximum swing angle of the wheel can be 70 degrees. At this angle of the wheel, the transmission rate will be 2.8 times less then when the angle is equal to zero and the hemisphere wheel is engaged at its major diameter. The second wheel of the transmission can be a regular narrow wheel or another hemisphere wheel similarly mounted and attached to the second shaft.

It is therefore an object of the present invention to provide an improved continuously variable mechanical transmission system which can be easily and economically produced, simple in principal, convenient in operation, sturdy in construction, highly efficient, long lasting and capable of operating under wide range of power and speed. It is another object of the invention to have a transmission with ratio of input to output that can be varied instead of fixed.

It is a further object of the present invention to have a continuously variable transmission system comprising: an input shaft is a flexible constant velocity device connected to a hemisphere wheel on the inside center of said hemisphere wheel and the hemisphere wheel having a bearing. A housing of the transmission having a mounting fork or other form of attachment to the hemisphere wheel at two pivot points on the stationary race of the bearing located on the inside circumference at the hemispheres major diameter or on the outside of it cylindrical extension. Further having a control lever with a joint attachment to the stationary race of the bearing that is perpendicular to the pivot points; and having an output shaft connected to a second wheel, and the second wheel's circumference engaged with the outside of said hemisphere wheel. Finally, the control lever having the ability to swing the hemisphere wheel around the pivot points to change the engaged diameter of the hemisphere wheel such that the difference in diameter from equator to pole creates a continuously variable transmission.

BRIEF DESCRIPTION OF THE DRAWINGS

In the accompanying drawings forming a material part of the description, there is shown:

FIG. 5 shows a perspective view of a fourth embodiment of the present invention.

FIG. 6 shows a top view of a fifth embodiment of the present invention.

DETAILED DESCRIPTION OF THE PREFERRED EMBODIMENT

Figure 1:
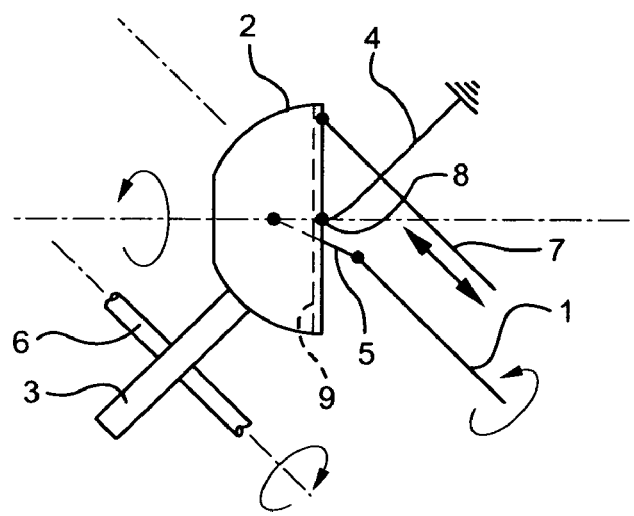
FIG. 1 shows a top view of the first embodiment of the continuously variable mechanical transmission consisting of the one hemisphere and one regular wheel.
Figure 2:
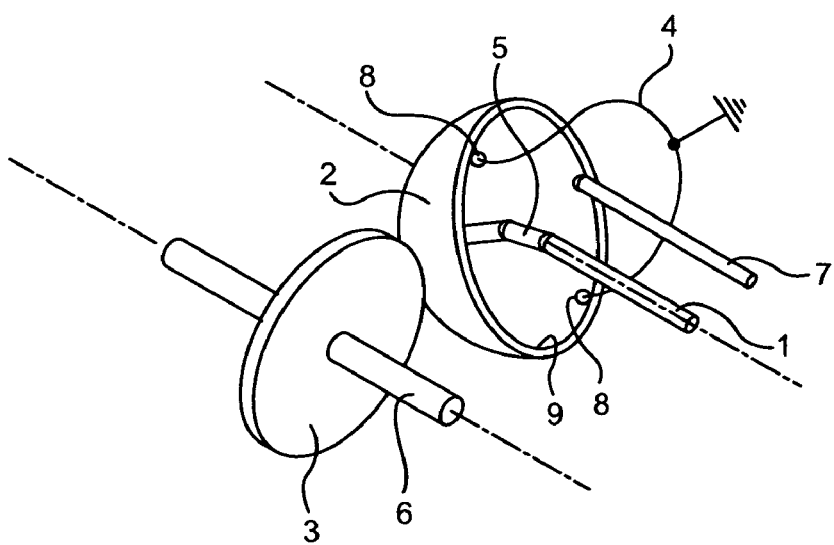
FIG. 2 shows perspective view of the first embodiment of the present invention.
Figure 8:
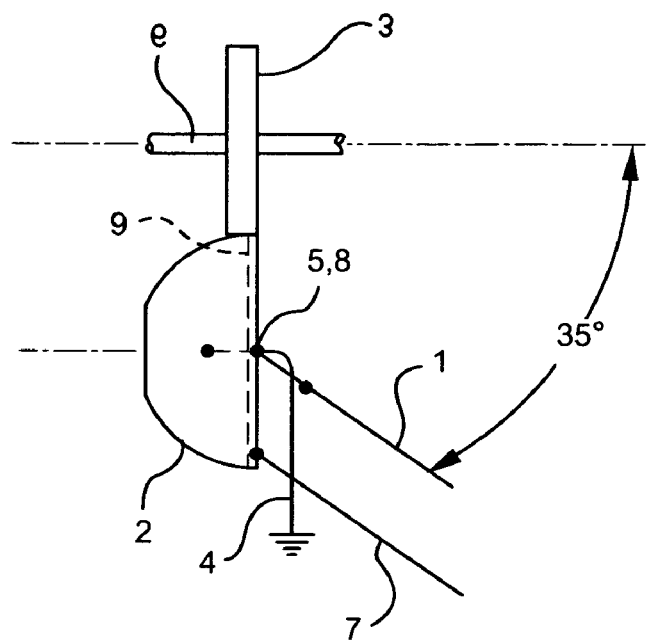
FIG. 8 shows a top view of seventh embodiment of the present invention having a single universal joint.

Referring to the FIG. 1, there is shown a first embodiment of the continuously variable mechanical transmission where input shaft 1 is connected to the hemisphere wheel 2 through a single or double universal joint 5 (FIG. 8 showing a single universal joint), flexible shaft or a similar constant velocity device. The hemisphere wheel is rotating on the bearing 9, the inner race of the bearing having two pivot points 8, attached to the mounting fork 4. The fork is fixed to the housing of the transmission (not shown). The fork 4 can be attached directly to the hemisphere wheel or, as well known in the art can have an intermediate member connecting the fork to the hemisphere wheel. The bearing 9 is located at the major diameter of the hemisphere wheel. However, as is well known in the art, the bearing can be in a number of places on the hemisphere wheel and is only a matter of design.

The control lever 7 determines the angle between the hemisphere wheel and the input shaft. The control lever 7 is connected to the inner race of the bearing 9 through a pivot joint. The hemisphere wheel is engaged through friction with the second wheel 3, mounted on the output shaft 6. As input shaft 1 is being driven by an outside source of power such as an engine or a motor, it is rotating the hemisphere wheel 2 with the same speed as the shaft through a constant velocity device 5. The speed of the wheel is the same as the input shaft regardless of the angle between the wheel and the shaft. An unspecified positioning device operates the control lever 7, such as, for example, a computer controlled hydraulic cylinder, or a computer controlled pneumatic cylinder, or an actuator. The control lever can, also, be controlled manually. The position of the control lever 7 is determining the angle between the wheel 2 and the shaft 1. When this angle is equal zero (the hemisphere wheel 2 and the shaft 1 are rotating on the same axis), the hemisphere wheel is engaged with the second wheel 3 at the hemisphere wheels major diameter. The output speed in this position is the highest allowed by the wheels diameter ratio. When the control lever 7 turns the hemisphere wheel around pivot points 8 to a maximum angle allowed by the constant velocity device 5, the hemisphere wheel is engaged with the second wheel 3 at the hemisphere wheels minor diameter. The output speed in this position is the lowest allowed by the wheel diameter ratio. If a universal joint is used to connect the driving shaft to the hemisphere wheel, the maximum swing angle of the wheel can be 70 degrees. At this angle of the wheel, the transmission rate will be 2.8 times less then when the angle is equal to zero and the hemisphere wheel is engaged at its major diameter. Due to the fact that the pivot points 8 lay on the major diameter of the hemisphere wheel, the engagement point between the wheels being at the radius distance from the pivot points does not change regardless of the angle between the hemisphere wheel and the input shaft. The step less transmission rate change is accomplished by turning the hemisphere wheel around the hemisphere wheel's pivot points.

In another embodiment of the present invention a motor 10 can be mounted on the stationary race of the bearing with it's shaft attached to the hemisphere wheel thus eliminating the need for a constant velocity device. This can be shown in FIG. 5.

Figure 3:
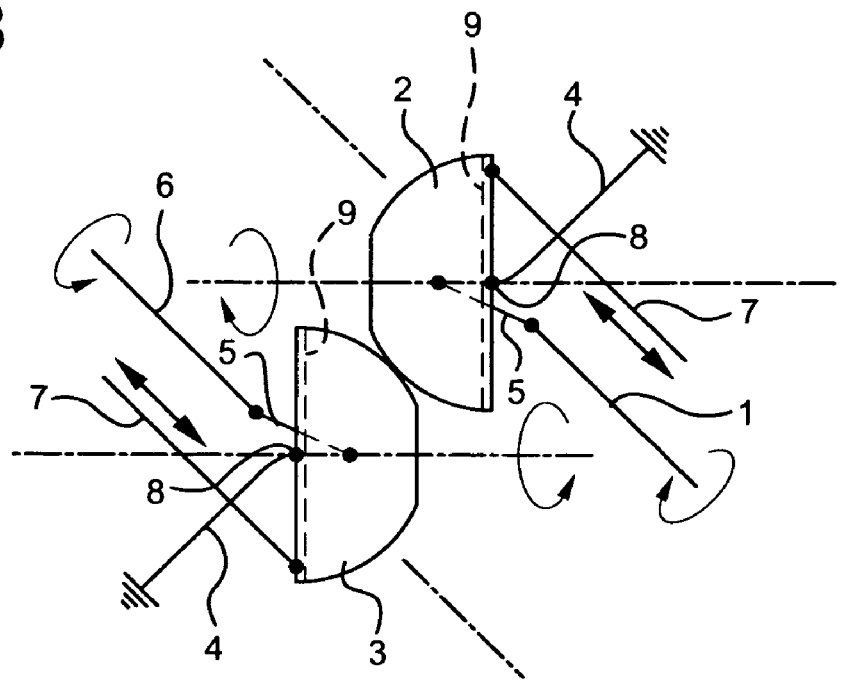
FIG. 3 shows a top view of the second embodiment of the continuously variable mechanical transmission consisting of the two hemisphere wheels.

Referring to the FIG. 3, this embodiment of the transmission is showing two hemisphere wheels engaged through friction. Two control levers 7 determine the position of each hemisphere wheel separately. The speed of the output shaft 6 is the highest when the major diameter of wheel 2 is engaged with the minor diameter of wheel 3. It is the lowest, when minor diameter of wheel 2 is engaged with major diameter of wheel 3.

Figure 4:
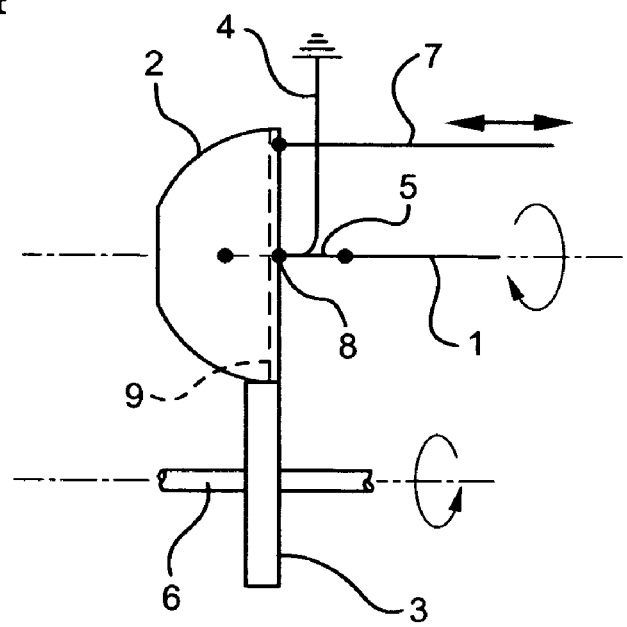
FIG. 4 shows a top view of the first embodiment of the continuously variable mechanical transmission with the hemisphere wheel rotating on the same axis with the input shaft.

Referring to FIG. 4, this is the first embodiment of the invention as described for FIG. 1, however the hemisphere wheel is rotating on the same axis as the input shaft.

Figure 7:
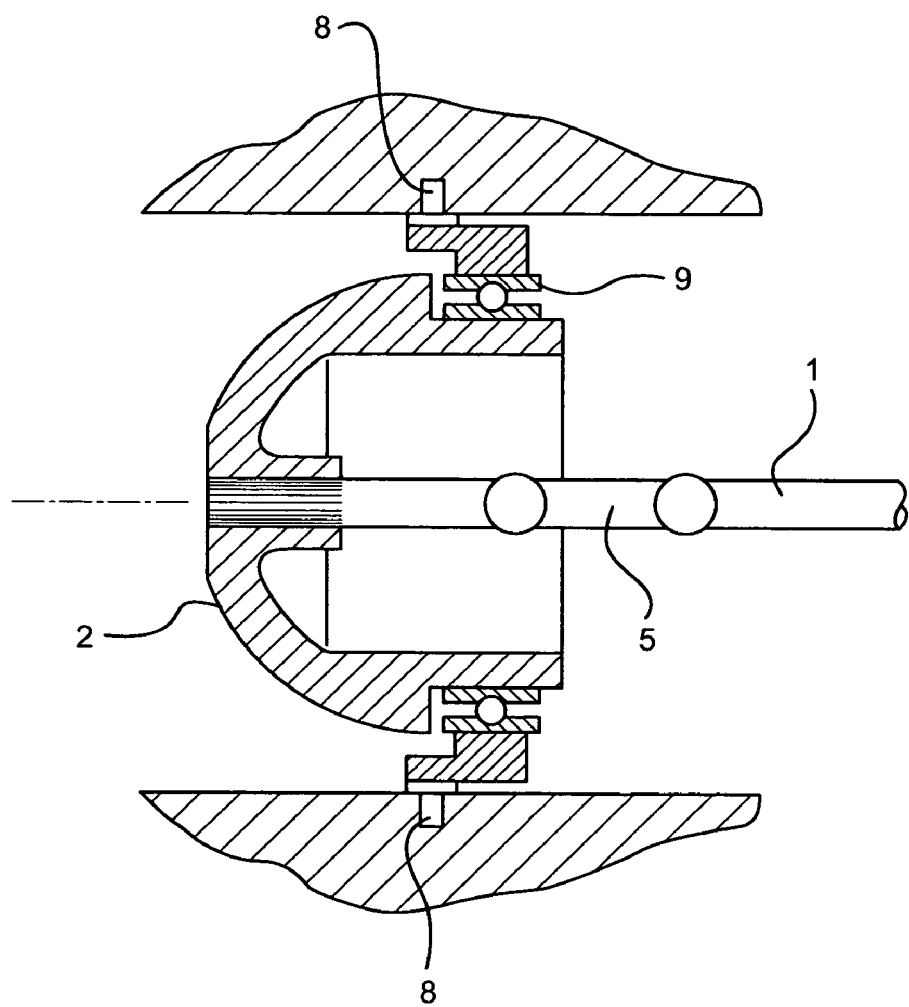
FIG. 7 shows a cross-section of the side view of the sixth embodiment of the present invention.
Figure 10:
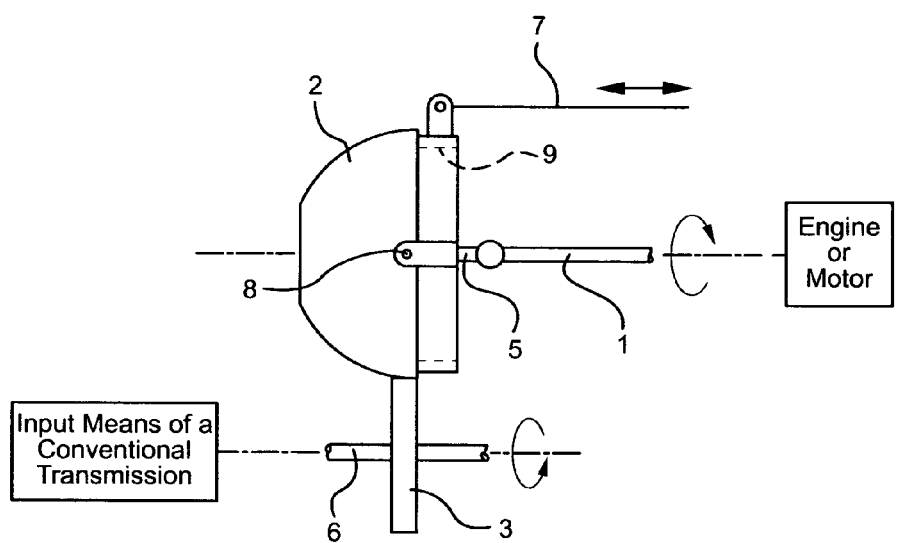
FIG. 10 shows a top view of a fifth embodiment of the present invention with two elements.

Referring to FIGS. 6 and 7 this embodiment of the transmission is showing a hemisphere wheel having a cylindrical extension from its major diameter with a bearing 9 mounted on the outside of the extension. The pivots 8 are attached to the outside race of the bearing and are mounted into the body of the transmission over the major diameter of the wheel. This embodiment has some major advantages over the previous embodiments. The hemisphere wheel attachment is much sturdier than a mounting fork. Therefore for the same scale of the apparatus higher strength can be achieved. Note FIG. 10 which shows the output 6 of the second wheel 3 attached to an input of a conventional transmission 42. FIG. 10 also shows the input 1 being attached to a motor or engine 44.

FIG. 8 is a seventh embodiment of this invention. FIG. 8 is basically the first embodiment of the invention described in FIG. 1, with one exception. FIG. 8 shows a single universal joint 5 as the constant velocity device.

Figure 9:
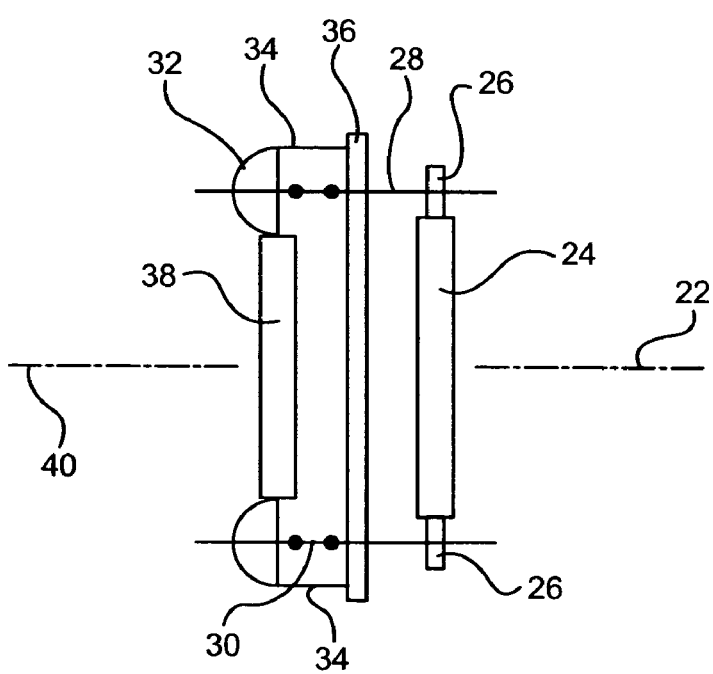
FIG. 9 shows a cross sectional view of an eighth embodiment of the present invention.

Another embodiment is shown in is shown in FIG. 9. A multi-hemisphere wheel version has an input means turning an input shaft 22 that turns an input wheel 24, which is engaged via friction or gears with sub-input wheels 26. There can be a minimum of two sub-input wheels and their corresponding hemisphere wheels, or there can be many sub-input wheels and their corresponding hemisphere wheels around the primary input wheel 24. The upper number of sub-input and corresponding hemisphere wheels is simply a matter of design and a desired transmission rate. Sub-input wheels 26 turn sub input shafts 28 connected to hemisphere wheels 32 through constant velocity devices 30. The hemisphere wheels 32 have bearings and pivot points as described in any of the previous embodiments of the current invention. These hemisphere wheels 32 being controlled by control levers 34. Control levers 34 being connected to control plate 36. Control plate 36 receives an input signal from an input signal means to tilt hemisphere wheels 32 from input signal means. The hemisphere wheels are then connected via friction to an output wheel 38 attached to output shaft 40.

While the invention has been particularly shown and described with reference to the preferred embodiments thereof, it will be understood by those skilled in the art that various changes in form, and details may be made without departing from the spirit and scope of the above described embodiments of the invention. The present invention can be adapted to any mechanical variable output device.

What is claimed is:

1. A continuously variable transmission system comprising:
    an input means for an input shaft wherein said input shaft is a flexible constant velocity device connected to a hemisphere wheel on the inside center of said hemisphere wheel;

said hemisphere wheel having a bearing located on the outside circumference of the hemisphere wheel;

a housing having a mounting attached to an outer race of the bearing at two opposing pivot points located at the hemispheres major diameter;

a control lever having a joint attachment to the outer race of the bearing, the joint attachment being circumferentially spaced about the outer race by 90 degrees with respect to the pivot points of the mounting;

an output means for an output shaft wherein said output shaft is connected to a second wheel at the center of said second wheel;

the circumference of said second wheel is engaged with the outside of said hemisphere wheel;

said control lever having the ability to swing the hemisphere wheel around the pivot points of the mounting to change the engaged diameter of the hemisphere wheel.

2. A continuously variable transmission system of claim 1 wherein the second wheel is a second hemisphere wheel:

said second hemisphere wheel having a flexible and movable connection on the inside center of said second hemisphere wheel;

said second hemisphere wheel having a second bearing located on the outside circumference of the second hemisphere wheel;

a second housing having a mounting attached to an outer race of the bearing at two opposing pivot points:

a second control lever having a joint attachment to the second outer race of the second bearing, the second joint attachment being circumferentially spaced about the outer race by 90 degrees with respect to the pivot points of the second mounting;

an outer circumference of said second hemisphere wheel engaged with an outer circumference of said first hemisphere wheel;

said control levers having the ability to swing both hemisphere wheels around the pivot points of the mountings to change the engaged diameters of both of the hemisphere wheels.

3. The transmission of claim 1, wherein the hemisphere wheel is engaged by friction to the second wheel.

4. The transmission of claim 1, wherein a ratio of input to output is not fixed.

5. The transmission of claim 1, wherein the output means are attached to the input means of a conventional transmission.

6. The transmission of claim 1, wherein the flexible constant velocity device is a double universal joint.

7. The transmission of claim 1, wherein the flexible constant velocity device is a single universal joint.

8. The transmission of claim 1, wherein the flexible constant velocity device is a flexible shaft.

9. The transmission of claim 1, wherein the input means is an engine or a motor.

10. The transmission of claim 1, wherein the control lever is controlled by one of the following:
   a. an hydraulic cylinder, or
   b. a pneumatic cylinder, or
   c. an actuator, or
   d. manually.

11. A continuously variable transmission system comprising:

an input means for an input shaft wherein said input shaft is a flexible constant velocity device connected to a hemisphere wheel on the inside center of said hemisphere wheel;

said hemisphere wheel having a bearing located on the inside circumference of the hemisphere wheel;

a housing having a mounting attached to an inner race of the bearing at two opposing pivot points located at the hemispheres major diameter;

a control lever having a joint attachment to the inner race of the bearing, the joint attachment being circumferentially spaced about the inner race by 90 degrees with respect to the pivot points of the mounting;

an output means for an output shaft wherein said output shaft is connected to a second wheel at the center of said second wheel;

the circumference of said second wheel is engaged with the outside of said hemisphere wheel;

said control lever having the ability to swing the hemisphere wheel around the pivot points of the mounting fork to change the engaged diameter of the hemisphere wheel.

12. The transmission of claim 11, wherein the flexible constant velocity device is a single universal joint.

13. The transmission of claim 11, wherein the constant velocity device is a motor mounted on a stationary race of the bearing, with a shaft of the motor connected to the hemisphere wheel.

* * * * *